Jan. 14, 1936. J. E. MOORE ET AL Re. 19,824

AUTOMATIC ENGLER DISTILLATION APPARATUS

Original Filed April 4, 1931 3 Sheets-Sheet 1

Inventors:
John E. Moore
George W. Chenicek
BY Bruce K. Brown
ATTORNEY

Jan. 14, 1936. J. E. MOORE ET AL Re. 19,824

AUTOMATIC ENGLER DISTILLATION APPARATUS

Original Filed April 4, 1931 3 Sheets-Sheet 2

Temp.——(46)
% Off——(47)

Inventors:
John E. Moore
George W. Chenicek
BY Bruce K. Brown
ATTORNEY

Jan. 14, 1936. J. E. MOORE ET AL Re. 19,824

AUTOMATIC ENGLER DISTILLATION APPARATUS

Original Filed April 4, 1931 3 Sheets-Sheet 3

Inventors:-
John E. Moore
George W. Chenicek
BY Bruce K. Brown
ATTORNEY

Reissued Jan. 14, 1936

Re. 19,824

UNITED STATES PATENT OFFICE 19,824

AUTOMATIC ENGLER DISTILLATION APPARATUS

John E. Moore and George W. Chenicek, Hammond, Ind., assignors to Standard Oil Company, Chicago, Ill., a corporation of Indiana Original No. 1,863,346, dated June 14, 1932, Serial No. 527,710, April 4, 1931. Application for reissue September 8, 1933, Serial No. 688,604

16 Claims. (Cl. 23—253)

This invention relates to distillation apparatus and it pertains more particularly to automatic means for making the standard Engler distillation test on petroleum oils.

The object of our invention is to eliminate the personal equation from the standard distillation tests so that results on any given oil may be duplicated more exactly. A further object is to provide an equipment which will be substantially foolproof and which will record automatically the desired information so that it may be operated by inexperienced persons, and so that a large number of tests may be run simultaneously by one operator. A further object is to provide an improved means for recording the results of distillation tests. Other objects will become apparent as the detailed description of our invention proceeds.

In practicing our invention we provide a system of automatic electric controls for regulating the heat input so that the distillation will proceed at a predetermined uniform rate. In one form of our invention, the results are automatically recorded on a clock driven chart, one curve showing the temperature at any given time and another curve showing the percent distilled off at any given time. From these curves the percent distilled off at any given temperature can be directly read. The temperature indicator is controlled by current through a thermocouple and the percent distilled indicator is controlled by current through a resistance which is varied by a float in the condensate receiver.

In another form of our invention, the rate of distillation is controlled to correspond with the rate at which the chart moves and a single curve is drawn showing the direct relationship between percent distilled off and distillation temperature.

The invention will be more clearly understood from the following description of certain preferred embodiments thereof.

In the accompanying drawings, wherein similar parts are designated by like reference characters,—

Figure 1:
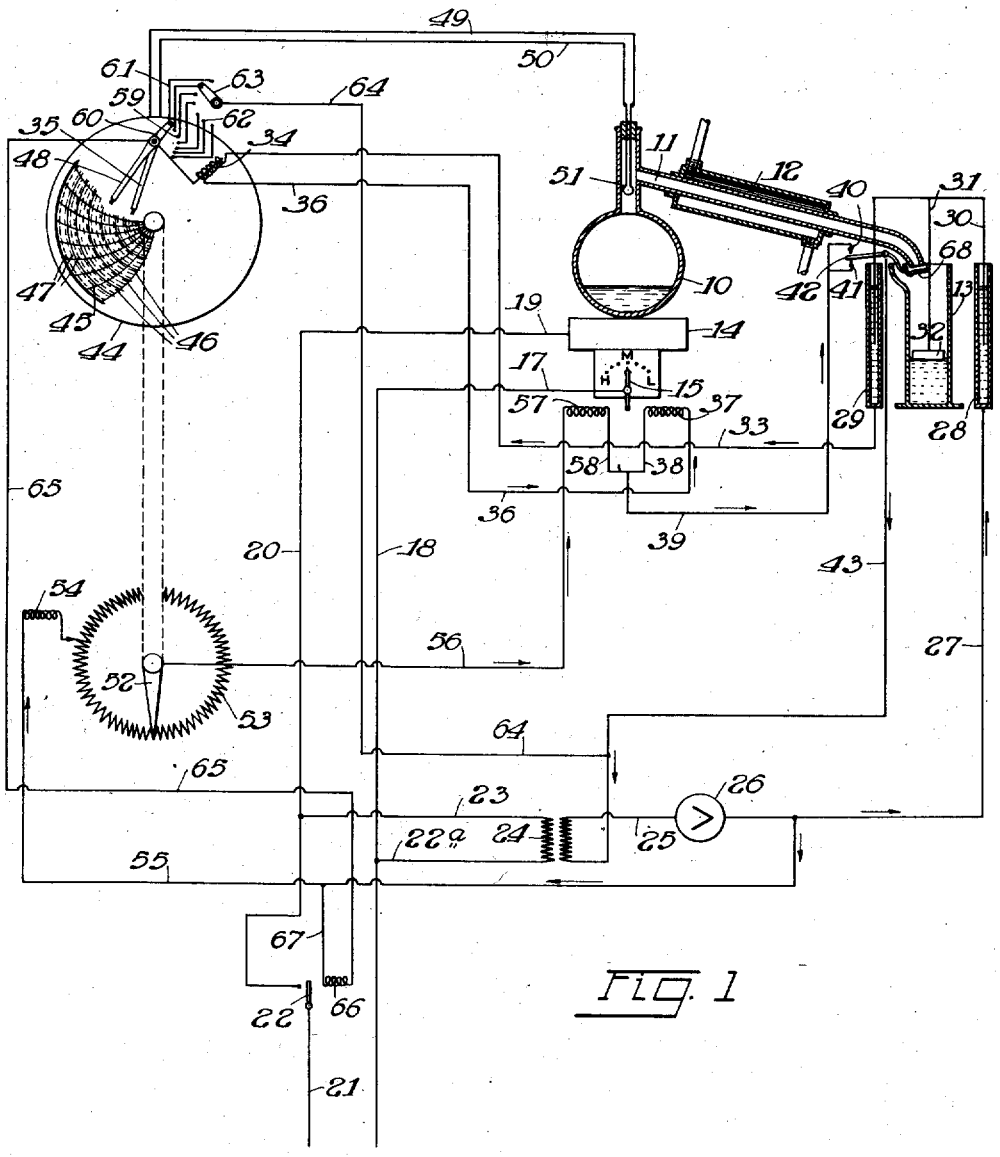
Figure 1 is a diagrammatic illustration of our improved invention showing the electrical circuits involved.

The conventional distillation flask 10 is provided with a side arm 11, and a water cooled condenser 12 of the usual type, and the apparatus is set up as directed by the A. S. T. M. (American Society for Testing Materials) specifications. The condenser discharges into a condensate receiver 13, which may be a graduate or other cylindrical vessel. The flask is heated by an electrical resistance heater 14, the temperature of which may be varied throughout a wide range by means of pivoted contact arm 15, the heater being connected directly through wires 17, 18, 19 and 20 to the alternating current source 21, which is preferably the standard 110 volt 60 cycle system. The current to this heater and to the entire apparatus may be turned off or on by means of switch 22.

Wires 22A and 23 lead from wires 18 and 20 to transformer 24, which steps down the voltage for the rectified circuit which will be hereinafter described. The voltage of this circuit will depend upon the type of rectifier used.

Wire 25 leads from one end of the transformer secondary to rectifier 26, which is in turn connected by wire 27 to mercury column 28 which is mounted at the side of distillate receiver 13. A similar mercury column 29 is mounted on the other side of the receiver and a U-shaped resistant unit 30 is adapted to move up and down in these columns in accordance with the amount of distillate in receiver 13, the top of the resistance unit being connected by an element 31 to float 32.

The two legs of the resistance unit 30 may be made of any suitable resistance metal, and if additional length is required it may be formed into a helical coil. As the distillate in the receiver increases in volume, the resistance unit will be moved upwardly out of the mercury (we may provide a suitable counterbalancing weight, not shown, whereby the resistance unit will be at substantial equilibrium in all positions so that it may be raised or lowered without a large amount of force being transmitted by the float 32).

Mercury column 29 is connected by wire 33 to indicator coil 34 which controls the movement of "percent off" indicating pen 35. The other end of coil 34 is connected by wire 36 to magnetic coil 37 which is, in turn, connected by wires 38 and 39 to spaced contacts 40 and 41. A pivoted lever 42 is adapted to make contact with points 40 or 41 as will be hereinafter described, and this pivoted lever is connected by wire 43 to the other end of the transformer secondary.

Figure 2:
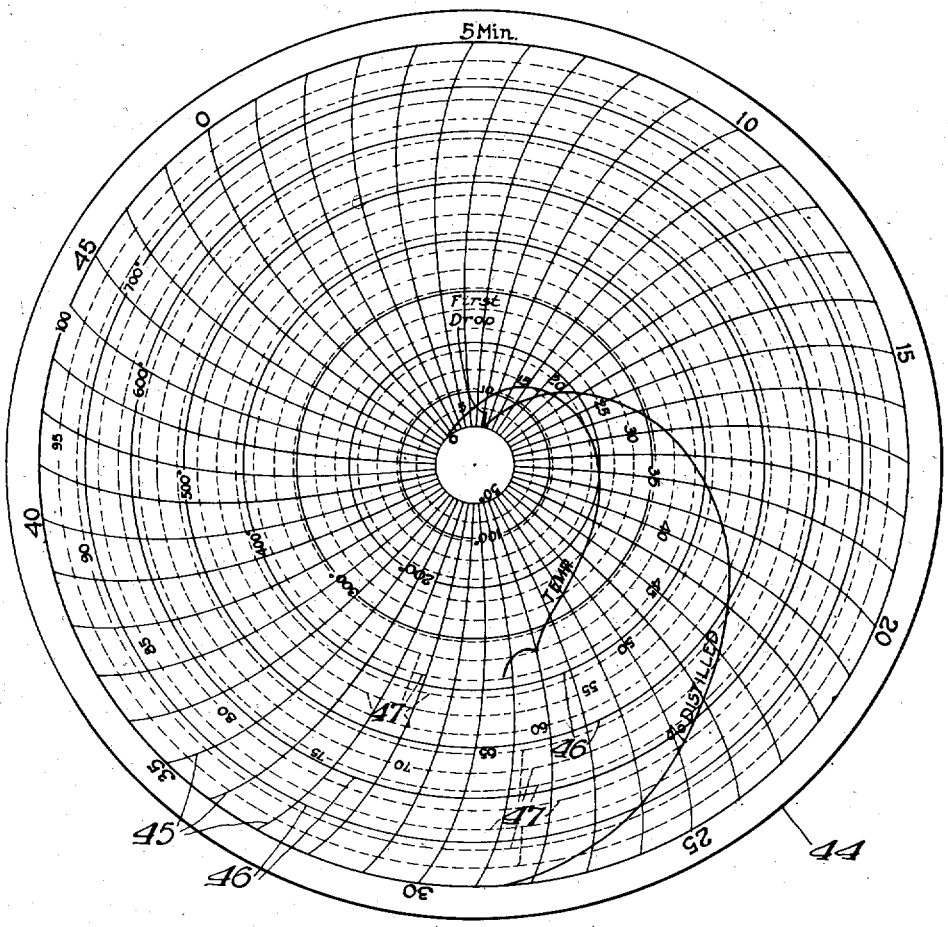
Figure 2 is a chart illustrating the recorded results of an Engler distillation.

In performing the standard Engler distillation test it is necessary that a certain rate of distillation be maintained. In order to record the percent off with respect to time, we provide a clock driven graph or chart 44 provided with time indicating increments or graduations 45, temperature indicating increments or graduations 46 and percent off indicating increments 47 (see Figure 2). The temperature is recorded by a suitable pen 48. This pen is driven by a suitable operating mechanism (not shown) which is connected by wires 49 and 50 to thermocouple 51 in the neck of flask 10 opposite the opening of side arm 11.

The clock works (not shown) are suitably connected to rotate contact arm 52 around the circular resistance element 53. This resistance element is connected through resistance 54 and wire 55 to wire 27 (the positive side of the rectified circuit). The movable contact arm is connected by wire 56 through magnetic coil 57, wire 58, wire 39, contact points 40 or 41, lever 42 and wire 43 to the negative side of the rectified circuit.

In order that the apparatus may be automatically shut off when the given temperature is reached we provide a series of points 59 adapted to be contacted by arm 60 which moves with the temperature recording pen 48. Points 59 are connected by conductors 61 to points 62 so that each point 62 corresponds to a given temperature. The switch arm 63 may be set on predetermined point 62 so that when the corresponding point 59 is contacted by arm 60, a direct current will flow through wire 64, wire 65, switch operating coil 66, wire 67 and wire 55 to the other side of the rectified circuit.

The operation of our improved apparatus is as follows: A measured amount of oil is poured into flask 10 and the flask is stoppered and closed up in accordance with A. S. T. M. specifications. Contact arm 52 is set back of resistance 54 and the clock works are started. The exact position of the contact arm need not be determined with great accuracy but we prefer to have the apparatus so regulated that contact arm 52 will be at the point where resistance 54 taps resistance 53 when the first drop of liquid is distilled. We then close the switch 22 which turns on the heater 14 and raises the liquid in flask 10 to distillation temperature. The temperature of the vapors in the neck of the flask is recorded by pen 48. When the first drop of liquid drips from the end of the condenser it is caught by a cup 68 which is mounted on one end of lever 42. The weight of this drop causes the lever to swing from contact arm 41 to contact arm 40, thus breaking for an instant the rectified current flowing through wire 39, wire 38, coil 37, wire 36 and indicator coil 34. The effect of this interruption is to cause the indicating pen to make a sharp mark on the chart (see Figure 2).

In practice, we prefer to hold the lever against contact arm 40 by a magnetic coil (not shown) connected in the circuit, so that we will not have to rely upon the weight of the first drop of liquid in cup 68 to hold the lever continuously in operative position.

As the distillation continues the condensate gradually buoys up float 32, which in turn raises resistance 30 out of the mercury, thereby increasing the resistance of the percent off circuit and decreasing the current flow through operating coil 34. Pen 35 is thus moved upwardly at a rate which corresponds exactly to the percent distilled off. If desired, we may increase the current flowing with an increase of condensate; this may be done by mounting the receiver on a floating resistance unit so that each increment of liquid received makes the resistance unit sink further into the mercury, thereby decreasing its effect.

It should be noted that this circuit is connected in parallel with the circuit which contains resistance 53 so that changes in this resistance do not change the readings of the percent off curve.

If the liquid distills at too rapid a rate, the current flowing through coil 57 will be greater than the current flowing through coil 37. These coils act magnetically to control the position of contact arm 15, and in this event will shift the arm from medium to low and decrease the temperature of the heater. On the other hand, if the distillation rate is too low, the current through coil 37 will be greater than the current through coil 57, and in this event the contact arm 15 will be moved from medium to high. It will thus be seen that we have provided an automatic means for controlling the temperature of the heater in accordance with the rate of distillation.

As above stated, contact arm 63 may be set at any desired temperature and when the temperature arm 48 reaches this point, arm 60 will close the circuit through switch operating coil 66 to automatically disconnect the whole system from the source of power.

Figure 3:
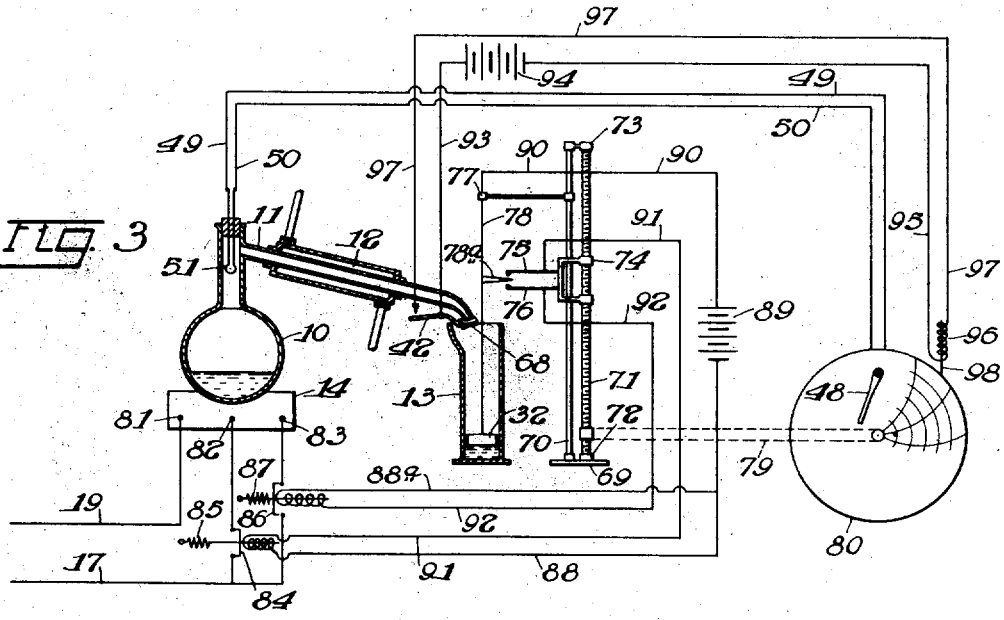
Figure 3 is a diagrammatic illustration, of another embodiment of our invention.

The modification shown in Figure 3 is designed to operate on a slightly different principle. In this system the heater is operated in such a manner that the distillation proceeds at a predetermined rate, the clock-driven graph is started when the first drop of liquid drips from the condenser and the temperature is plotted against time. This is equivalent to plotting the temperature against percent off, since a given amount of oil will be distilled at any time after the first drop.

In this system we provide a fixed base 69 supporting a vertical post 70 and a rotatable screw 71 parallel to post 70 and journaled in bearings 72 and 73. A carriage 74 fits over post 70 and screw 71, and it is internally threaded so that it may be driven by screw 71 to reciprocate up and down on the post. Carriage 74 carries contact arms 75 and 76, which are insulated, from each other and which are a fraction of a centimeter apart. Near the top of post 70 we provide a guide 77 for positioning wire 78; this wire is moved up and down by float 32 and it carries a contact point 78A which is adapted to fit between contact arms 75 and 76.

Screw 71 is connected by a shaft or chain 79 to the clock works which drives the chart 80. The particular means of driving the screw by the clock works is immaterial and it will not be described in detail.

Wire 19 is connected to one side of the heating element by wire 81. Wire 17 is connected to an intermediate point of the heating element by wire 82 and to the other end of the heating element by wire 83. A relay operated switch 84 normally closes the circuit in wire 82 and it is held in operative position by spring 85. Another relay operated switch 86 is adapted to close the circuit in wire 83, but it is normally held out of operating position by spring 87. The relay which operates switch 84 is connected by wire 88 to battery 89, and thence by a fine wire 90 to wire 78, on which is mounted contact point 78A. The other side of the relay which operates switch 84 is connected by wire 91 to contact arm 75.

The relay which operates switch 87 is connected by wire 88A to wire 88, battery 89, wire 90 and contact point 78A. The other side of this relay is connected by wire 92 to contact arm 76. Pivoted lever 42 is connected by wire 93 to battery 94 and thence by wire 95 to solenoid 96, which is, in turn, connected by wire 97 to a contact point with which lever 42 is adapted to engage. Solenoid 96 is adapted to pull operating lever 98 to start the clock mechanism.

The operation of this embodiment is as follows: A predetermined amount of oil is placed in the flask and the apparatus is set up in accordance with A. S. T. M. specifications. Operating switch 22 is then closed, and since switch 84 is normally closed, a current will flow from wires 17 and 19 to the heater 14. The resistance elements in the heater between wires 81 and 82 are designed to give a relatively large amount of heat, an amount which normally would be sufficient to effect distillation at the desired rate.

Figure 4:
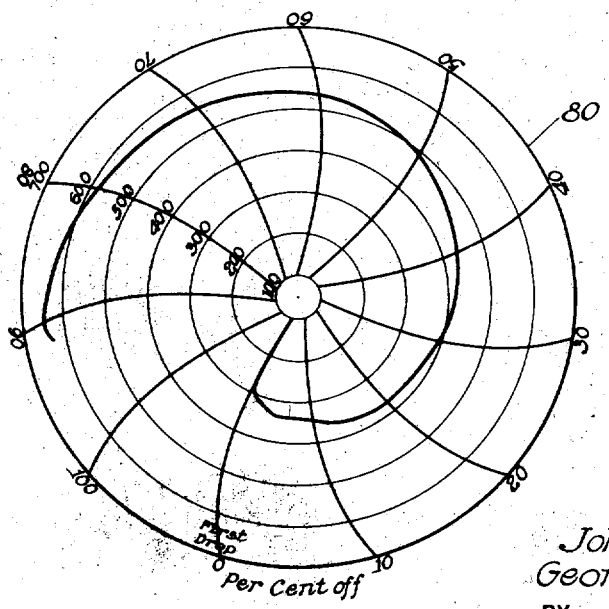
Figure 4 is a chart illustrating the results of an Engler distillation recorded on the modification shown in Figure 3.

When the first drop of condensate drips from the condenser arm 11 into cup 68 on lever 42, it closes the circuit in wire 93, battery 94, wire 95, solenoid 96 and wire 97, and the action of the solenoid on starting lever 98, starts the clock. Up to this time the temperature indicator is moved out on a radial line from the center of the chart (note Figure 4) so that the point on the graph at which the temperature curve leaves the zero radial line is the temperature of the first drop. The clock works, acting through mechanism 79, rotates screw 71 to lift carriage 74, and the pitch of the screw thread and diameter of the receiver are designed so that the carriage will move upwardly at a rate corresponding to the desired rate of distillation (that is, the desired rate of the elevation of float 32). If the distillation rate is too low, contact arm 76 will close circuit through contact point 78A to actuate relay operated switch 86 and increase the temperature of the heater. This increase in temperature is large enough to cause increased distillation sufficient to raise float 32 and thereby disengage point 78A from arm 76. On the other hand, if the distillation proceeds too rapidly, point 78A will contact with arm 75, and switch 84 will be opened to shut off the heat entirely. It will be seen that the constant opening and closing of switches 84 and 86 will automatically insure distillation at a constant rate, so that the time increments or graduations on the chart are accurate indicators of percent off. Thus, from Figure 4 it will be seen that at 500° there was about 51% off; at 600° there was about 83% off, etc.

A suitable shutoff switch may be provided with the second embodiment along the same lines as that illustrated in Figure 1, and in both of our improved embodiments it will be seen that the percent off is automatically plotted against the temperature and that the temperature is automatically regulated in accordance with the percent distilled.

While we have disclosed preferred embodiments of our invention it is understood that we do not limit ourselves to the details therein set forth except as defined by the following claims.

We claim:

1. Distillation apparatus comprising a distillation flask, a condenser connected with said flask, a receiver for the condensate formed in said condenser, heating means for said flask, a chart, an electrical circuit including two contact points, a pivoted lever adapted to alternately contact said points, means on said lever for intercepting a drop of condensate whereby the lever is caused to move from one contact point to the other, means for recording distillation temperatures on said chart, and means actuated by said electrical circuit for indicating on said chart the interception of said first drop of condensate, whereby the distillation temperature at the time said first drop of condensate is received can be determined from said chart.

2. Distillation apparatus comprising a distillation flask, a condenser connected with said flask, a receiver for the condensate formed in said condenser, heating means for said flask, a chart, a normally closed electrical circuit including two contact points, means actuated by the first drop of condensate from said condenser for opening said electrical circuit, means for recording distillation temperatures on said chart, and means actuated by the opening of said electrical circuit for making an indication on said chart, whereby the distillation temperatures at the time said first drop of condensate actuates said means for opening said electrical circuit can be determined from said chart.

3. Distillation apparatus comprising a distillation flask, a condenser connected with said flask, a receiver for the condensate formed in said condenser, heating means for said flask, a chart, a mercury column adjacent said receiver, a resistance unit extending into said mercury column, and means for varying the immersion of said resistance unit in said column in accordance with the amount of condensate in the receiver, an electrical circuit including said resistance unit, and means responsive to said electrical circuit for continuously indicating on said chart the amount of condensate in said receiver.

4. Distillation apparatus comprising a distillation flask, a condenser connected with said flask, a receiver for the condensate formed in said condenser, electrical heating means for said flask, electromagnetic means for controlling the total current flowing through said electrical heating means, said electromagnetic means including two electromagnetic operating coils, one of said coils tending to increase the temperature of said heater and the other to decrease the temperature of said heater in proportion to the flow of current therethrough, means for changing the current flowing in one coil at a constant rate and means for changing the current flowing in the other coil at a rate dependent upon the rate of distillation.

5. Distillation apparatus comprising a distillation flask, a condenser connected with said flask, a receiver for the condensate formed in said condenser, electrical heating means for said flask, an alternating current power source, means for transforming and rectifying said alternating current, an electromagnetic means for controlling the temperature of said heater including a plurality of parallel circuits connected to said transforming and rectifying means, one circuit including a constantly varying resistance and a magnetic coil and the other circuit including an indicator coil, a second magnetic coil, and a resistance which is varied in proportion with the amount of liquid which has been distilled, one of said magnetic coils tending to increase the amount of current flowing through said electrical heating means and the other of said magnetic coils tending to decrease the amount of current flowing through said electrical heating means in proportion to the flow of current therethrough.

6. Distillation apparatus comprising a distillation flask, a condenser connected with said flask, a receiver for the condensate formed in said condenser, means for heating a flask, electromagnetic means, including two electromagnetic coils, for controlling the temperature of said heater, a source of direct current, means for connecting two circuits in parallel across said direct current source, one of said circuits including one of said electromagnetic coils, a variable resistance in the same circuit, means for continuously varying said resistance, the other of said circuits including the remaining electromagnetic coil, a variable resistance in said other circuit, means for varying said resistance in accordance with the amount of liquid distilled, an indicator coil in said second circuit means for moving a chart at a uniform rate, means actuated by said indicating coil for indicating on said chart the percent of said liquid distilled, and means for automatically and simultaneously indicating on said chart the distillation temperatures.

7. Distillation apparatus comprising a distillation flask, a condenser connected with said flask, a receiver for the condensate formed in said condenser, electrical heating means for said flask, a chart graduated for temperature and percent distilled off, means for moving said chart at a predetermined speed, means responsive to the level of condensate in said receiver, means actuated by said last-mentioned means for controlling the amount of current flowing through said electrical heating means, whereby the rate of distillation is maintained in proportion to the speed at which said chart is moved, and means responsive to the distillation temperature for inscribing a curve on said chart, said curve indicating the distillation temperatures corresponding to various percents distilled off.

8. Distillation apparatus comprising a distillation flask, a condenser connected with said flask, a receiver for the condensate formed in said condenser, heating means for said flask, electrical controlling means for said heating means, a chart graduated for temperature and percent distilled off, means for moving said chart at a predetermined speed, means responsive to the level of condensate in said receiver, means actuated conjointly by said means for moving said chart and said means responsive to the level of condensate for actuating said electrical controlling means, whereby the rate of distillation is maintained in proportion to the speed at which said chart is moved, and means responsive to the distillation temperature for inscribing a curve on said chart, said curve indicating the distillation temperatures corresponding to various percents distilled off.

9. Distillation apparatus comprising a distillation flask, a condenser connected with said flask, a receiver for the condensate formed in said condenser, heating means for said flask, electrical controlling means for said heating means, a chart graduated for temperature and percent distilled off, means for moving said chart at a predetermined speed, a float in said receiver, an electrical contact moving in accordance with the movement of said float, a second electrical contact adapted to coact with said first-mentioned electrical contact moving in the same direction as said first-mentioned electrical contact at a speed proportional to the speed of movement of said chart, an electrical circuit including said two electrical contacts and actuating said electrical controlling means, whereby the rate of distillation is maintained in proportion to the speed at which said chart is moved, and means responsive to the distillation temperature for inscribing a curve on said chart, said curve indicating the distillation temperatures corresponding to various percents distilled off.

10. Distillation apparatus comprising a distillation flask, a condenser connected with said flask, a receiver for the condensate formed in said condenser, an electrical heating means for said flash, a chart graduated for temperature and percent distilled off, means for moving said chart, a float in said receiver, an electrical contact moving in accordance with the movement of said float, a second electrical contact moving in the same direction as said first-mentioned electrical contact at a speed corresponding to the movement of said chart, said second electrical contact being adapted to coact with said first-mentioned electrical contact when the rate of distillation exceeds a rate corresponding to the movement of said chart, an electrical circuit including said two electrical contacts, the coaction of said two electrical contacts serving to close said last-mentioned electrical circuit, means actuated by the closing of said electrical circuit for decreasing the flow of current through said electrical heating means, means for increasing the flow of current through said electrical heating means when said two electrical contacts no longer coact, whereby the rate of distillation is maintained in proportion to the speed at which said chart is moved, and means responsive to the distillation temperature for inscribing a curve on said chart, said curve indicating the distillation temperatures corresponding to various percents distilled off.

11. Distillation apparatus according to claim 10 which includes in addition to the elements of claim 10 a second electrical heating means for said flask.

12. Distillation apparatus comprising a distillation flask, a condenser connected with said flask, a receiver for the condensate formed in said condenser, an electrical heating means for said flask, a chart graduated for temperature and percent distilled off, means for moving said chart, a float in said receiver, an electrical contact moving in accordance with the movement of said float, a second electrical contact moving in the same direction as said first-mentioned electrical contact at a speed proportional to the speed of movement of said chart, said second electrical contact being adapted to coact with said first-mentioned electrical contact when the rate of distillation falls below a rate corresponding to the movement of said chart, an electrical circuit including said two electrical contacts, the coaction of said two electrical contacts serving to close said last-mentioned electrical circuit, means actuated by the closing of said electrical circuit for increasing the flow of current through said electrical heating means, means for decreasing the flow of current through said electrical heating means when said two electrical contacts no longer coact, whereby the rate of distillation is maintained in proportion to the speed at which said chart is moved, and means responsive to the distillation temperature for inscribing a curve on said chart, said curve indicating the distillation temperatures corresponding to various percents distilled off.

13. Distillation apparatus according to claim 12 which includes in addition to the elements of claim 12 a second electrical heating means for said flask.

14. Distillation apparatus comprising a distillation flask, a condenser connected with said flask, a receiver for the condensate formed in said condenser, a first and a second electrical heating means for said flask, a chart graduated for temperature and percent distilled off, means for moving said chart, a float in said receiver, a first electrical contact moving in accordance with the movement of said float, a second and a third electrical contact both moving in the same direction as said first electrical contact at a speed proportional to the speed of movement of said chart, said first and second electrical contacts being adapted to coact when the rate of distillation exceeds a rate corresponding to the movement of said chart, said first and third electrical contacts being adapted to coact when the rate of distillation falls below a rate corresponding to the movement of said chart, a first electrical circuit including said first and second electrical contacts, the coaction of said first and second electrical contacts serving to close said first electrical circuit, means actuated by the closing of said first electrical circuit for decreasing the flow of current through said first electrical heating means, means for increasing the flow of current through said first electrical heating means when said first and second electrical contacts no longer coact, a second electrical circuit including said first and third electrical contacts, the coaction of said first and third electrical contacts serving to close said second electrical circuit, means actuated by the closing of said second electrical circuit for increasing the flow of current through said second electrical heating means, means for decreasing the flow of current through said second electrical heating means when said first and third electrical contacts no longer coact, whereby the rate of distillation is maintained in proportion to the speed at which said chart is moved, and means responsive to the distillation temperature for inscribing a curve on said chart, said curve indicating the distillation temperatures corresponding to various percents distilled off.

15. Distillation apparatus comprising a distillation flask, a condenser connected with said flask, a receiver for the condensate formed in said condenser, heating means for said flask, a chart means for moving said chart, graduations on said chart located along the path of movement of said chart and corresponding to percent distilled off, means responsive to the level of condensate in said receiver, means responsive to said chart moving means, means for controlling said heating means in accordance with the differential between the position of said chart moving means and the position of said means responsive to the level of condensate, whereby the rate of distillation is maintained in accordance with the movement of said chart, and means for automatically recording distillation temperature on said moving chart transversely to its path of movement, whereby a single curve is recorded on said chart, said curve representing the distillation temperatures corresponding to each percent distilled off.

16. Distillation apparatus comprising a distillation flask, a condenser connected with said flask, a receiver for the condensate formed in said condenser, electrical heating means for said flask, a chart, means for moving said chart, means responsive to the level of condensate in said receiver, means controlled by said last mentioned means whereby the position of said chart at any instant during the distillation bears a fixed and predetermined relationship to the level of condensate in said receiver at said instant, means responsive to distillation temperature, and recording means controlled by said means responsive to distillation temperature, said recording means moving along said chart in a direction other than the direction of motion of said chart, whereby a single curve is inscribed on said chart, said curve representing the relationship between distillation temperature and the level of condensate in said receiver at various instants throughout the distillation.

JOHN E. MOORE.
GEORGE W. CHENICEK.